(12) United States Patent
Nishikawa (10) Patent No.: US 7,390,049 B2
(45) Date of Patent: Jun. 24, 2008

(54) VEHICLE DOOR

(75) Inventor: Ikuo Nishikawa, Hiroshima (JP)

(73) Assignee: Hirotec Corporation, Hiroshima (JP)

( * ) Notice: Subject to any disclaimer, the term of this patent is extended or adjusted under 35 U.S.C. 154(b) by 249 days.

(21) Appl. No.: 11/185,966

(22) Filed: Jul. 21, 2005

(65) Prior Publication Data

US 2006/0181107 A1 Aug. 17, 2006

(51) Int. Cl.
*B60J 5/04* (2006.01)
(52) U.S. Cl. .................................................. 296/146.1
(58) Field of Classification Search .............. 296/146.1, 296/146.2, 146.5, 146.9; 49/502
See application file for complete search history.

(56) References Cited

U.S. PATENT DOCUMENTS

| | | | |
|---|---|---|---|
| 4,648,208 A | | 3/1987 | Baldamus et al. |
| 5,820,191 A | * | 10/1998 | Blakewood et al. ...... 296/37.13 |
| 6,047,762 A | * | 4/2000 | Anderson .............. 160/370.22 |
| 6,557,304 B2 | * | 5/2003 | Ellis ............................ 49/441 |
| 6,719,355 B2 | * | 4/2004 | Ornig et al. .............. 296/146.5 |
| 7,111,894 B2 | * | 9/2006 | Kora et al. ............... 296/146.1 |
| 2002/0095397 A1 | * | 7/2002 | Koskas .......................... 707/1 |
| 2004/0216387 A1 | * | 11/2004 | Furuse ........................ 49/502 |
| 2004/0244298 A1 | * | 12/2004 | Ogawa et al. ................. 49/502 |
| 2005/0081448 A1 | * | 4/2005 | Ishii et al. ..................... 49/352 |
| 2005/0204634 A1 | * | 9/2005 | Nozaki et al. ................. 49/441 |

FOREIGN PATENT DOCUMENTS

| | | |
|---|---|---|
| DE | 3217640 | 5/1982 |
| JP | 56-033712 | 4/1981 |
| JP | 58-209617 | 12/1983 |
| JP | 62-036816 | 3/1987 |
| JP | 02-056716 | 4/1990 |
| JP | 08-142677 | 6/1994 |
| JP | 07-329572 | 12/1995 |
| JP | 10-138760 | 5/1998 |
| JP | 11-059185 | 3/1999 |
| JP | 2000108664 | * 4/2000 |
| JP | 2001246934 | * 9/2001 |
| JP | 2002-307948 | 10/2002 |
| JP | 2003-220830 | 8/2003 |
| JP | 2004-189164 | 7/2004 |
| JP | 2005-153767 | 6/2005 |
| JP | 2005-153768 | 6/2005 |
| JP | 2006151144 | * 6/2006 |

OTHER PUBLICATIONS

Notice of Reasons for Rejection mailed Jan. 16, 2007.
Notice of Reasons for Rejection mailed Jun. 12, 2007.

* cited by examiner

*Primary Examiner*—H Gutman
(74) *Attorney, Agent, or Firm*—Studebaker & Brackett PC; Donald R. Studebaker (57) ABSTRACT

A rear side sash component 10 of a sash is composed of an inner panel 13 and an outer panel 14. The inner panel 13 is press-formed to have a raised part 21 bulging toward the vehicle interior. The amount of projection of the raised part 21 is increased with approach to its lower end. The outer panel 14 is press-formed to have a flat part 15 the lateral dimension of which is increased with approach to its lower end. The inner and outer panels 13 and 14 are joined together to provide a rear side sash component 10 increasing its cross-sectional size with approach to its lower end.

1 Claim, 12 Drawing Sheets

VEHICLE DOOR

BACKGROUND OF THE INVENTION (a) Field of the Invention

This invention relates to a vehicle door placed on each side of a vehicle such, for example, as a passenger car.

(b) Description of the Related Art

There is a type of conventional vehicle door that has a sash formed on top of a door body to surround a window glass as disclosed, for example, in Patent Document 1 (Japanese Unexamined Patent Publication No. S58-209617) and Patent Document 2 (Japanese Unexamined Patent Publication No. H08-142677). The sash of this type is composed of a rear side part extending upward from a rear-side upper part of the door body along the rear edge of the window glass, and a top side part connected to the upper end of the rear side part and extending frontward along the top edge of the window glass.

The sash in Patent Document 1 is constructed by joining an outer panel to an inner panel. The inner panel is roll-formed to have a closed cross section. On the other hand, the sash in Patent Document 2 is composed of a single, roll-formed plate.

During a high-speed run of a vehicle, a large pressure difference is caused between the vehicle interior and the outside so that a force toward the outside of the vehicle acts on the window glass. As a result, the sash is acted on by an external force to tend to shift its upper end toward the outside of the vehicle with respect to its lower end located at the boundary with the door body. In order to withstand this external force, it is necessary to enhance the rigidity of the sash. If, however, a sash is formed in a closed cross section only by roll forming like the above Patent Documents 1 and 2, it is difficult to roll-form the sash to alter its cross-sectional shape along its length. Therefore, the rigidity of the sash cannot sufficiently be enhanced.

The present invention has been made in view of the above point and its object is to ensure the rigidity of the sash by making it possible to flexibly design the shape of the rear side part of the sash.

SUMMARY OF THE INVENTION

In order to attain the above object, in the present invention, the rear side sash component constituting the rear side part of the sash is composed of an inner panel and an outer panel, the inner panel is press-formed and the outer panel is press-formed or roll formed.

More specifically, the present invention is directed to a vehicle door in which a door body placed on each side of a vehicle is provided with a sash for holding a window glass. Further, the sash comprises a rear side sash component extending upward from an upper part of the rear end of the door body along the rear edge of the window glass, the rear side sash component is formed by joining an inner panel and an outer panel together, and the inner panel is press-formed and the outer panel is press-formed or roll-formed such that the cross-sectional size of the rear side sash component is increased with approach to the lower end thereof.

With this structure, since the inner panel of the rear side sash component is press-formed, this allows flexible design of the longitudinal configuration as compared with if it is roll-formed. Then, when the inner panel is joined to the outer panel, a rear side sash component can be easily provided in part of which toward the lower end has an increased cross-sectional size. Since the cross-sectional size of the part of the rear side sash component toward the lower end can be easily increased, the sash can be given a sufficient rigidity. In addition, the cross-sectional size of the part of the rear side sash component toward the upper end can be easily reduced, which provides a light-weight, compact sash.

The inner panel of the rear side sash component may have a vertically extending raised part raised toward the vehicle interior, and the raised part may be formed such that its dimensions in the directions of interior to exterior and front to rear of the vehicle are increased with approach to the lower end of the rear side sash component.

With this structure, when the inner and outer panels are joined together, the rear side sash component increases its cross-sectional size toward the vehicle interior and in the direction of front to rear of the vehicle with approach to the lower end of the rear side sash component. This gives a sufficiently large cross-sectional size to the part of the rear side sash component toward the lower end and thereby further enhances the rigidity of the sash.

Further, when the outer panel is roll-formed, the cross-sectional shape of the outer panel can be easily complicated.

The door body may be formed by joining an inner member and an outer member together, the rear side of the inner member may be provided with a latch mechanism placement part in which a latch mechanism is placed, a lower part of the inner panel of the rear side sash component may extend at least to the latch mechanism placement part, and the inner panel and the latch mechanism placement part may be joined together in overlapping relation.

With this structure, the latch mechanism placement part of the door body is reinforced by the lower part of the inner panel. Thus, the rigidity of the latch mechanism placement part can be ensured without leading to increase number of parts, which provides cost reduction.

A lower part of the inner panel of the rear side sash component may extend to the vicinity of the lower end of the door body to form a rear end part of the door body.

With this structure, since the sash and the door body are integrated by the inner panel of the rear side sash component, the joint strength between the sash and the door body can be increased without leading to increased number of parts.

The outer panel of the rear side sash component may be formed integrally with a channel-shaped holder part for holding the rear edge of the window glass.

With this structure, since the rear edge of the window glass is held by the holder part formed integrally with the outer panel, this eliminates the need to provide an additional part for holding the window glass, which reduces the number of parts for the sash and thereby provides weight reduction and cost reduction. Further, since the holder part has a channel shape, this enhances the rigidity of the outer panel and thereby further enhances the rigidity of the rear side sash component.

Parts of the inner and outer panels of the rear side sash component located toward the window glass may be formed away from each other in the direction of interior to exterior of the vehicle, and a channel-shaped holder member for holding the rear edge of the window glass may be provided between the inner and outer panels, the holder member being formed separately from the inner and outer panels.

With this structure, since the holder member is separate from the inner and outer panels, both the panels can be formed more easily than when the inner or outer panel has an integral part formed in a channel shape.

When the separate holder member is provided between the inner and outer panels, the end of the outer panel of the rear side sash component located toward the rear edge of the window glass may be hemmed to hold one end of the holder member in a sandwich manner.

In this case of the present invention, since the end of the holder member is covered with the end of the outer panel, the sash can be given a good appearance without the need for finishing touches, which reduces the number of manufacturing steps. In addition, the worker can be prevented from touching the end of the holder member in assembling the door to the vehicle, which provides a safe assembly of the door to the vehicle.

Further, when the separate holder member is provided between the inner and outer panels, at lease one of the end of the outer panel of the rear side sash component located toward the rear edge of the window glass and the end of the inner panel thereof located toward the rear edge of the window glass may be overlapped with a corresponding end of the holder member and welded thereto.

In this case of the present invention, since at least one of the end of the outer panel and the end of the inner panel is bonded to the end of the holder member by welding, the outer panel or the inner panel can be firmly joined to the holder member without complicating the manufacturing process.

The sash may further comprise a top side sash component extending from the upper end of the rear side sash component along the top edge of the window glass toward the front of the vehicle, and the top side sash component may be roll-formed to have an integral holder part for holding the top edge of the window glass.

In this case of the present invention, the top side sash component having a holder part for the window glass can be constructed in a single plate material. Thus, the number of parts for the top side sash component can be reduced, which provides cost reduction.

The sash may further comprise a top side sash component extending from the upper end of the rear side sash component along the top edge of the window glass toward the front of the vehicle, and the top side sash component may include an outside member press-formed to form an vehicle exterior surface of the top side sash component.

In this case of the present invention, the vehicle exterior surface of the top side sash component can be formed by the outside member obtained by press forming which relatively easily provides high forming accuracy. Thus, the top side sash component can be given a good appearance.

The sash may further comprise a top side sash component extending from the upper end of the rear side sash component along the top edge of the window glass toward the front of the vehicle, the top side sash component may be formed by joining an inside member located toward the vehicle interior to an outside member located toward the outside of the vehicle, and the outside member may be roll-formed.

With this structure, the cross section of the outside member of the top side sash component can be complicated. The cross-sectional shape of the outside member can enhance the rigidity of the top side sash component.

The sash may further comprise a top side sash component extending from the upper end of the rear side sash component along the top edge of the window glass toward the front of the vehicle, the top side sash component may include an outside member formed to form an vehicle exterior surface of the top side sash component, and an upper part of the rear side sash component may have a cutaway formed in a substantially L-shape in side view, the cutaway being butt-welded at the edge to the rear end of the outside member.

With this structure, the rear side sash component and the outside member can have a large joint area, which enhances the joint strength.

The sash may further comprise a top side sash component extending from the upper end of the rear side sash component along the top edge of the window glass toward the front of the vehicle, and the rear end of the top side sash component may be formed substantially linearly and butt-welded to an upper part of the rear side sash component.

With this structure, the top side sash component and the rear side sash component can be joined together while the rear edge of the top side sash component and the upper part of the rear side sash component have simple linear shapes.

The sash may further comprise a top side sash component extending from the upper end of the rear side sash component along the top edge of the window glass toward the front of the vehicle, and the inner panel of the rear side sash component may be formed integrally with an inside member of the top side sash component forming a vehicle interior surface thereof and an inner member of the door body forming a vehicle interior surface thereof.

With this structure, respective vehicle interior side members of the rear side sash component, the top side sash component and the door body can be formed concurrently in a single process step.

DETAILED DESCRIPTION OF THE INVENTION

An embodiment of the present invention will be described below in detail with reference to the drawings. The following description of the preferred embodiment is merely illustrative in nature and is not intended to limit the scope, applications and use of the invention.

Figure 2:
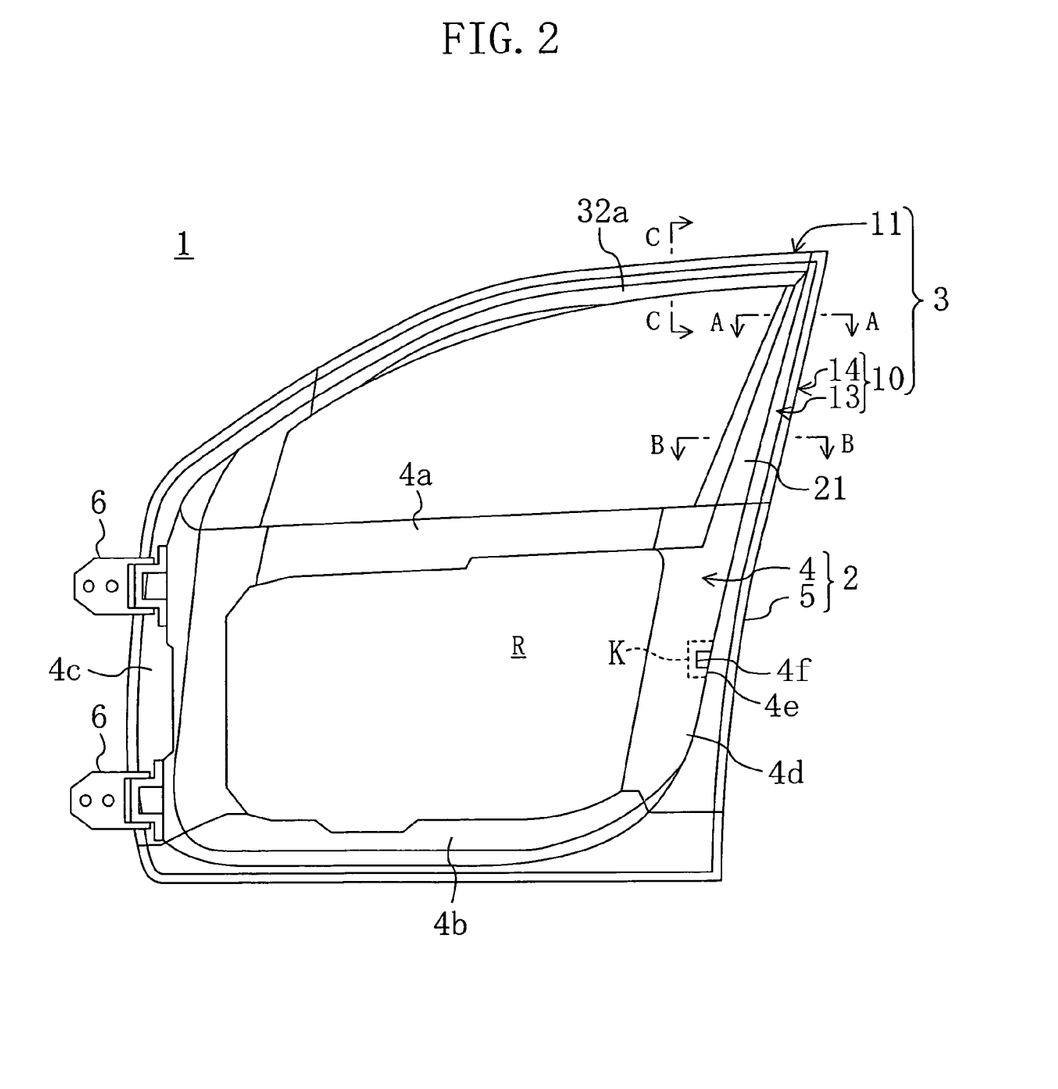
FIG. 2 is a side view of a vehicle door according to an embodiment of the present invention when viewed from the vehicle interior.

FIG. 2 shows a vehicle door 1 according to an embodiment of the present invention. This vehicle door 1 is of the type mounted on the right side of a passenger car. In the description of this embodiment, for convenience of explanation, "front" refers to the side toward the front of the vehicle and "rear" refers to the side toward the rear of the vehicle.

Figure 4:
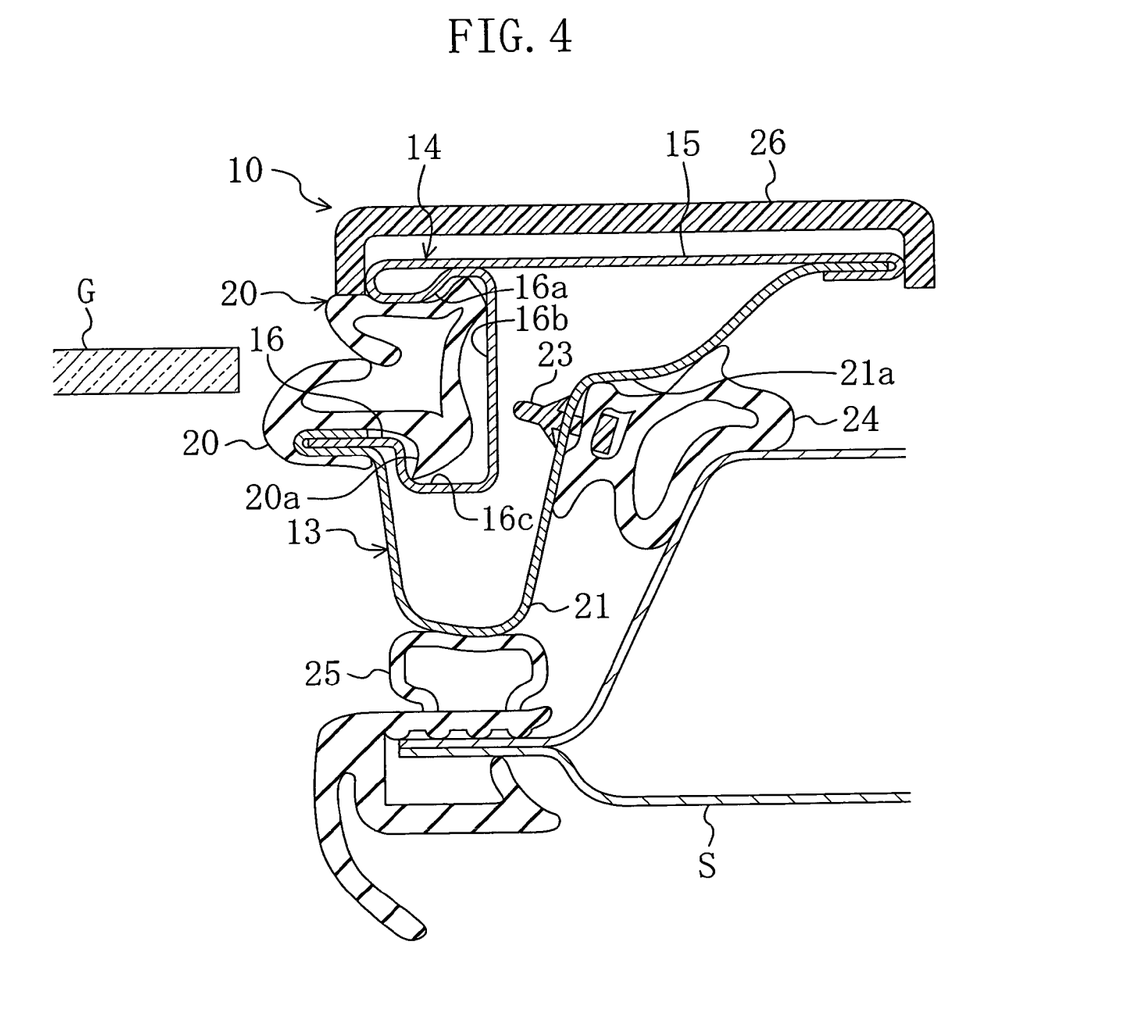
FIG. 4 is a corresponding view of the cross-sectional view taken along the line A-A of FIG. 2 when the vehicle door assembled with a glass run and other elements is closed.

The vehicle door 1 is composed of a door body 2 constituting the lower half of the door 1 and a sash 3 provided on top of the door body 2 to hold a window glass G (shown in FIG. 4 alone). The door body 2 is constructed by joining marginal parts of a plate-like inner member 4 located to the vehicle interior to marginal parts of a plate-like outer member 5 located to the outside of the vehicle. The inner member 4 is formed by arranging long plate materials 4a, 4b, 4c and 4d at upper, lower, front and rear positions, respectively, combining and joining them together into a rectangular frame and press-forming the frame. The four plate materials 4a, 4b, 4c and 4d can have different thicknesses and can undergo different surface treatments.

The inner member 4 bulges, toward the vehicle interior, at its part closer to the door center than the marginal parts bonded to the outer member 5. A space R for accommodating the window glass G is formed between the inner and outer members 4 and 5. This window glass G is supported by an unshown elevating mechanism to move up and down through between the upper plate material 4a of the inner member 4 and the top end part of the outer member 5. Though not shown, the vehicle interior side of the inner member 4 is covered with a door trim.

Figure 1:
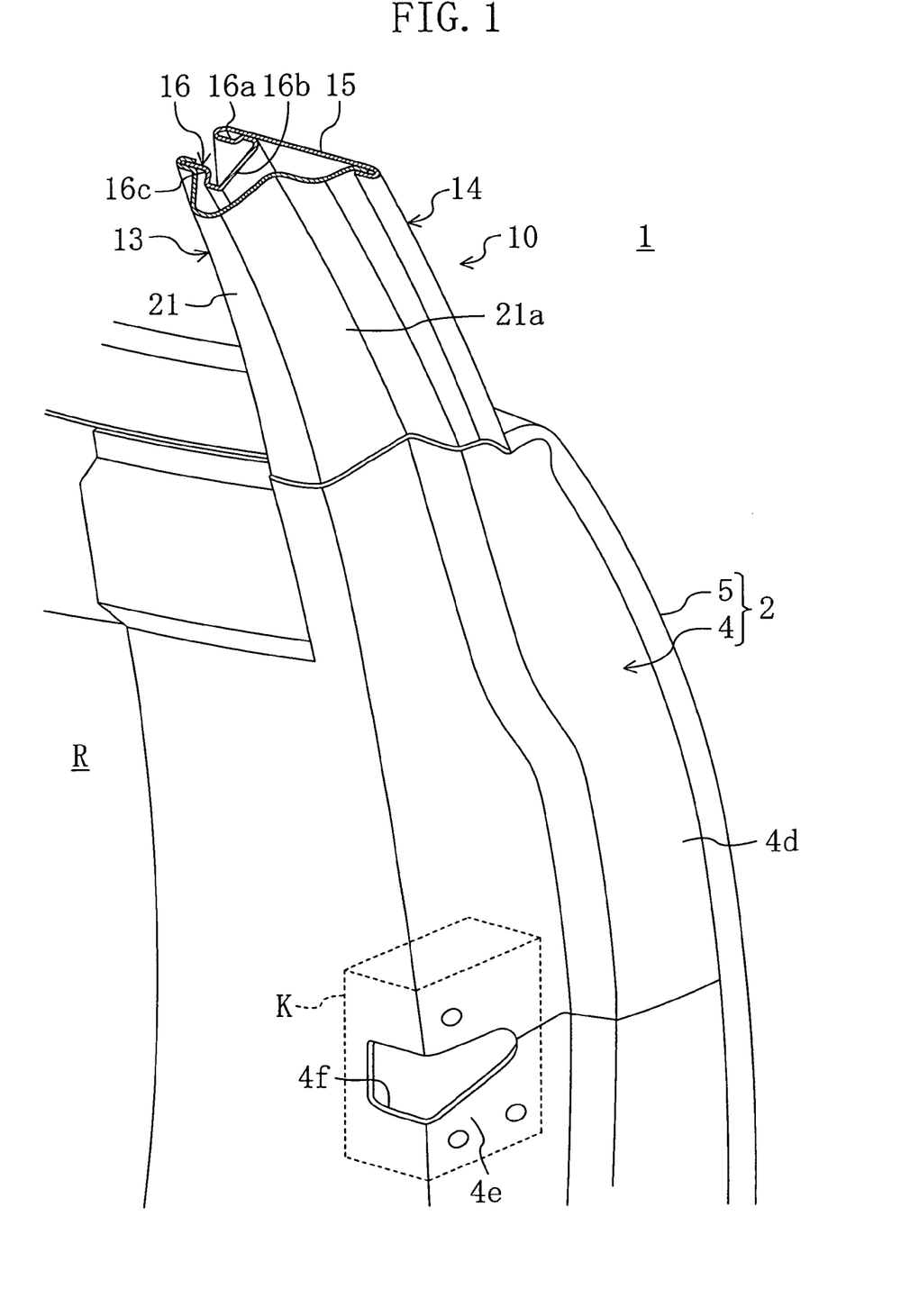
FIG. 1 is a perspective view of a rear part of a vehicle door when viewed from the rear.

The front plate material 4c of the inner member 4 is provided with a pair of vertically spaced hinges 6 which are to be fixed to a font pillar (not shown) of the vehicle. The vehicle door 1 moves pivotally about an axis extending vertically between the hinges 6. The rear plate material 4d of the inner member 4 is provided, as shown in FIG. 1, with a latch mechanism placement part 4e in which a latch mechanism K is placed to engage with and disengage from a striker (not shown) of a center pillar S (shown in FIG. 4) of the vehicle. This latch mechanism placement part 4e is formed with a hole 4f to expose the latch mechanism K. This latch mechanism K and the striker are configured to hold a closed position of the vehicle door 1.

As shown in FIG. 2, the sash 3 comprises a rear side sash component 10 for holding the rear edge of the window glass G when raised, a top side sash component 11 for holding the top edge of the same window glass G. If the sash 3 is constructed by combining the two components 10 and 11 in this manner, this makes it possible to form the components 10 and 11 individually from different plate materials having different thicknesses.

The lower end part of the rear side sash component 10 extends upward from a rear-side upper part of the door body 2. The rear side sash component 10 is joined at its upper end to the rear end of the top side sash component 11. The top side sash component 11 is gently inclined downward along the top edge of the window glass G with approach from its joint with the rear side sash component 10 to its front end, and extends to the top of the front end of the door body 2.

The rear side sash component 10 is composed of an inner panel 13 located to the vehicle interior and an outer panel 14 located to the outside of the vehicle. The outer panel 14 is press-formed and has a flat part 15 extending both in vertical and front-to-rear directions and a channel-shaped holder part 16 for holding the rear edge of the window glass G.

Figure 3A:
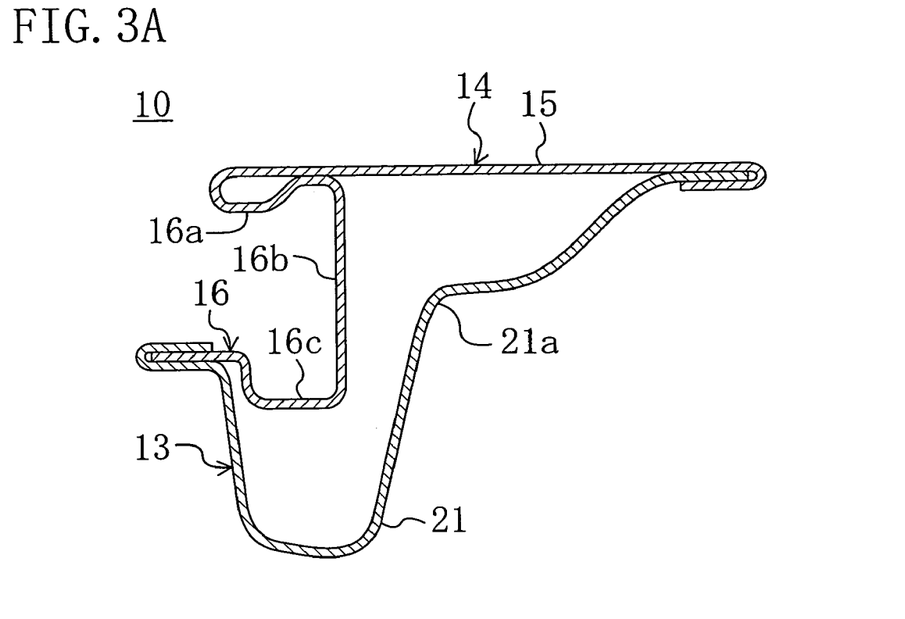
FIG. 3A is a cross-sectional view taken along the line A-A of FIG. 2.
Figure 3B:
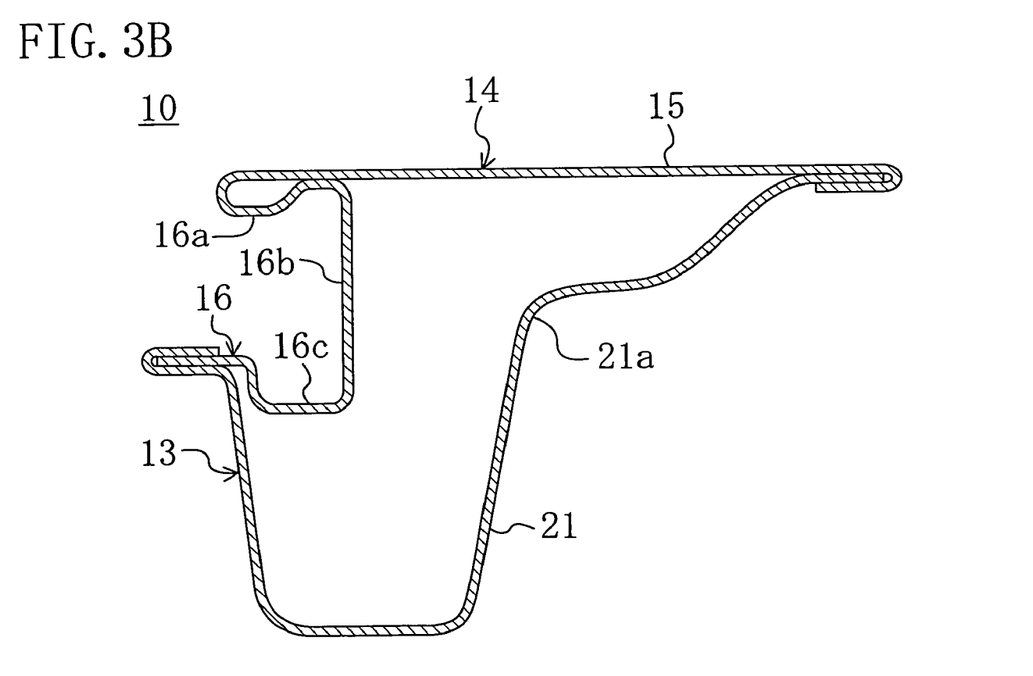
FIG. 3B is a cross-sectional view taken along the line B-B of FIG. 2.
Figure 5:
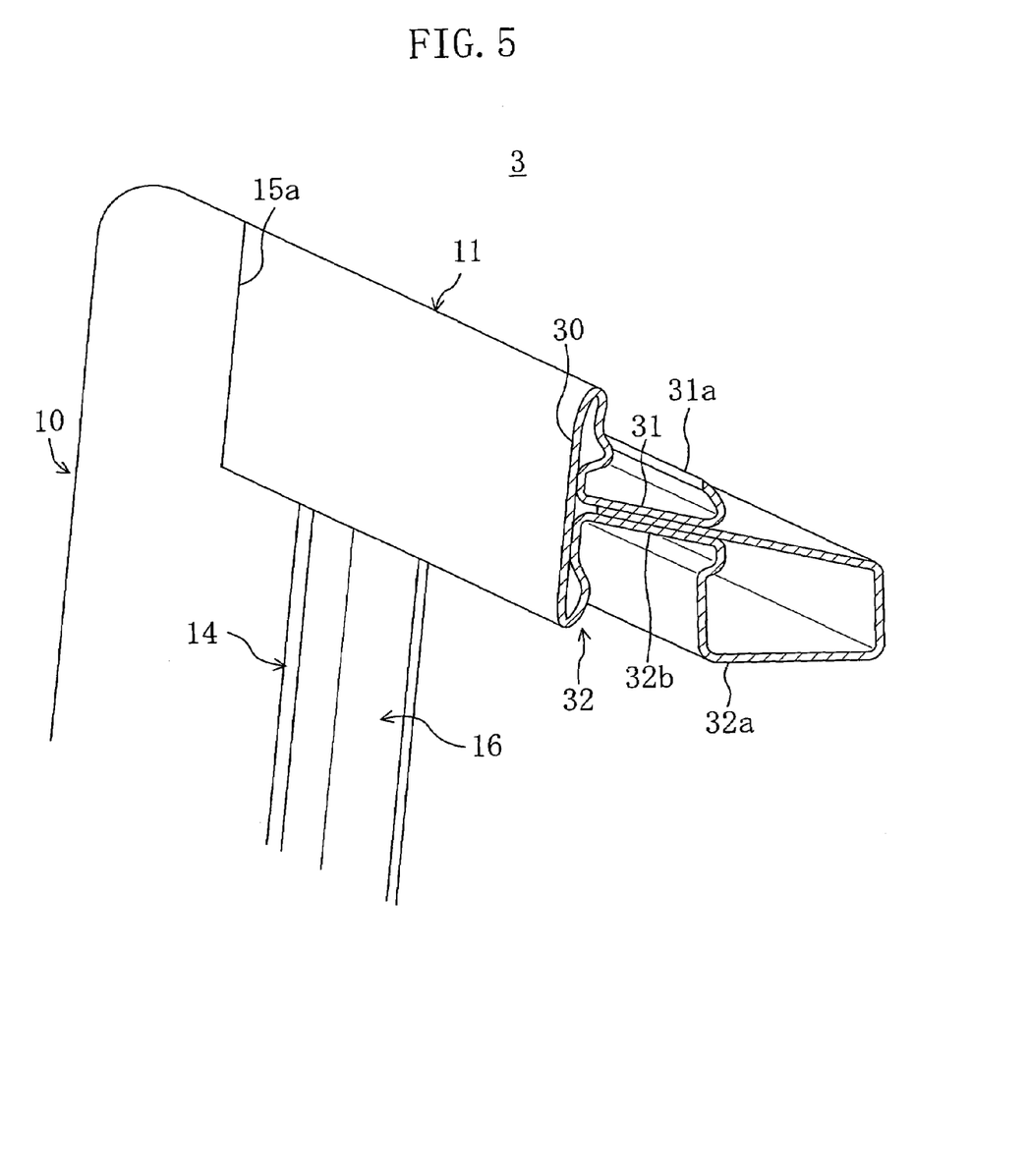
FIG. 5 is a perspective view of an upper part of a sash of the vehicle door when viewed from the outside of the vehicle.

As shown in FIGS. 3A and 3B, the flat part 15 of the outer panel 14 is formed such that its front-to-rear dimension is increased with approach to its lower end. The front end of this flat part 15 continues to an outside wall 16a of the holder part 16 which extends rearward from the front end of the flat part 15. The rear end of the outside wall 16a continues to a bottom wall 16b of the holder part 16 which extends from the rear end of the outside wall 16a toward the vehicle interior. Further, the vehicle interior side end of the bottom wall 16b continues to an inside wall 16c of the holder part 16 which extends frontward from the vehicle interior side end of the bottom wall 16b. The bottom wall 16b of the holder part 16 is formed to have a longer dimension in the direction of interior to exterior of the vehicle than the opening of the holder part 16. With this structure, as shown in FIG. 4, a rubber-made glass run 20 is held by the holder part 16 with the engagement of its claw 20a with the inner surface of the holder part 16 simply by pushing the glass run 20 into the holder part 16. This eliminates the need to set an additional member for mounting the glass run 20 to the rear side sash component 10, which makes it possible to reduce the number of parts for the sash 3. Further, as shown in FIG. 5, the upper end of the outer panel 15 is formed with a cutaway 15a to have a substantially L-shape in side view.

The inner panel 13 is an integral piece press-formed to have a vertically extending raised part 21 bulging toward the vehicle interior in the middle of the inner panel 13 in the front to rear direction. As shown in FIG. 1, the lower end of the inner panel 13 is welded to the rear plate material 4d of the inner member 4. Specifically, the inner panel 13 and the inner member 4 are bonded together prior to press forming and then press-formed together.

The front end of the inner panel 13 is hemmed to hold the inside wall 16c of the holder part 16 in a sandwich manner. The rear end of the inner panel 13 is overlapped with the rear end of the flat part 15 and the rear end of the flat part 15 is hemmed to hold the rear end of the inner panel 13 in a sandwich manner. In this way, the inner panel 13 and the outer panel 14 are joined together.

As shown in FIGS. 3A and 3B, the raised part 21 formed on the inner panel 13 is configured such that its front-to-rear dimension is increased with approach to its lower end according to the front-to-rear dimension of the flat part 15 formed on the outer panel 14. Further, the raised part 21 is also configured such that its dimension in the direction of interior to exterior of the vehicle is increased with approach to its lower end. In other words, the inner and outer panels 13 and 14 are formed such that the cross-sectional size of the rear side sash component 10 increases with approach to its lower end.

As shown in FIG. 4, the raised part 21 is formed with a depression 21a conforming to the shape of the center pillar S. A rubber-made, hollow sealing material 24 is fixed to the depression 21a by a fastener 23. The sealing material 24 is formed in a loop to surround the outer edge of the sash 3 and the outer edge of the door body 2. A rubber-made, hollow sealing member 25 attached to the center pillar S is pressed against the distal end of the raised part 21, i.e., the vehicle interior side end thereof. Further, a resin-made garnish 26 is attached to the outer panel 14 to cover the outer surface of the flat part 15.

Figure 6:
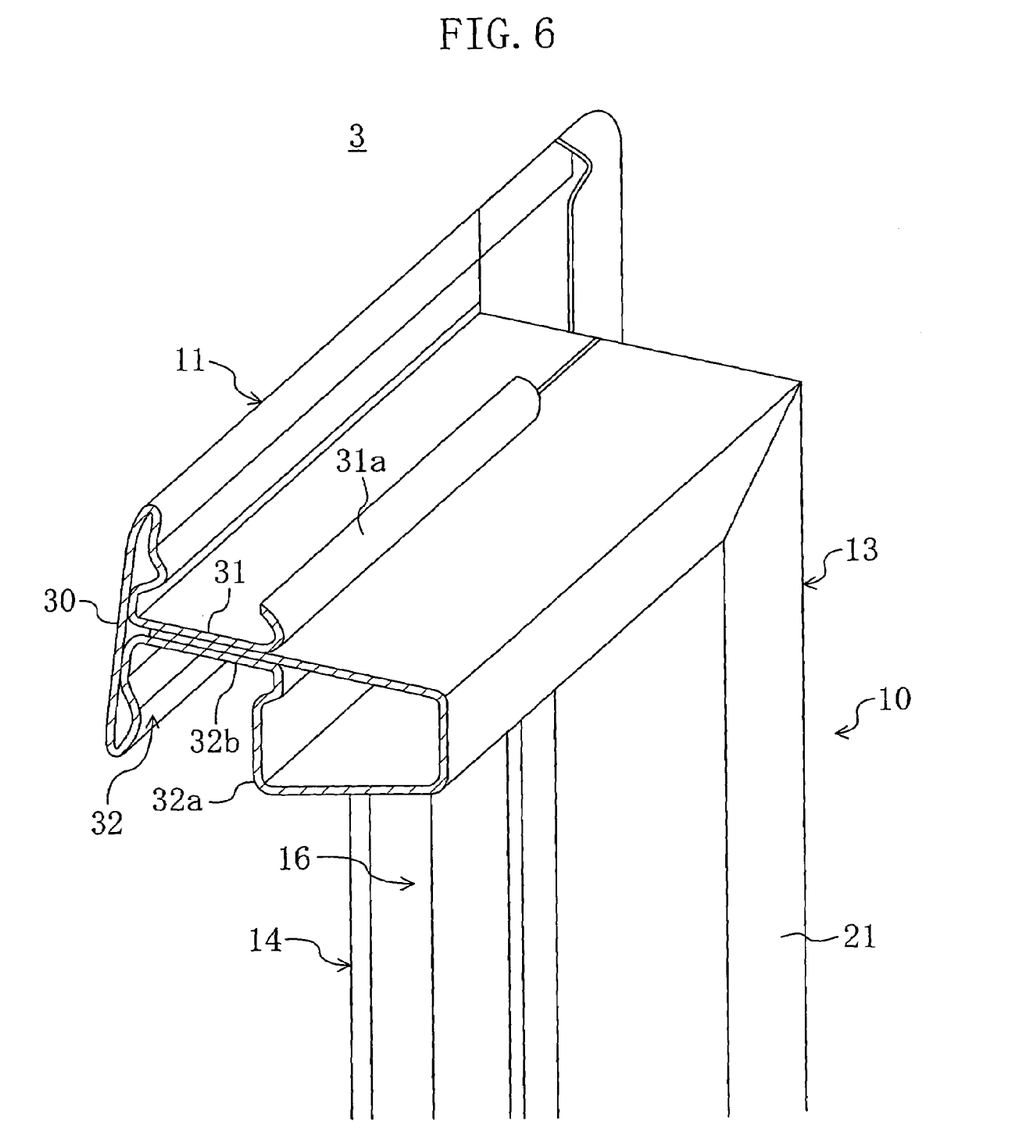
FIG. 6 is a perspective view of the upper part of the sash of the vehicle door when viewed from the vehicle interior.
Figure 7:
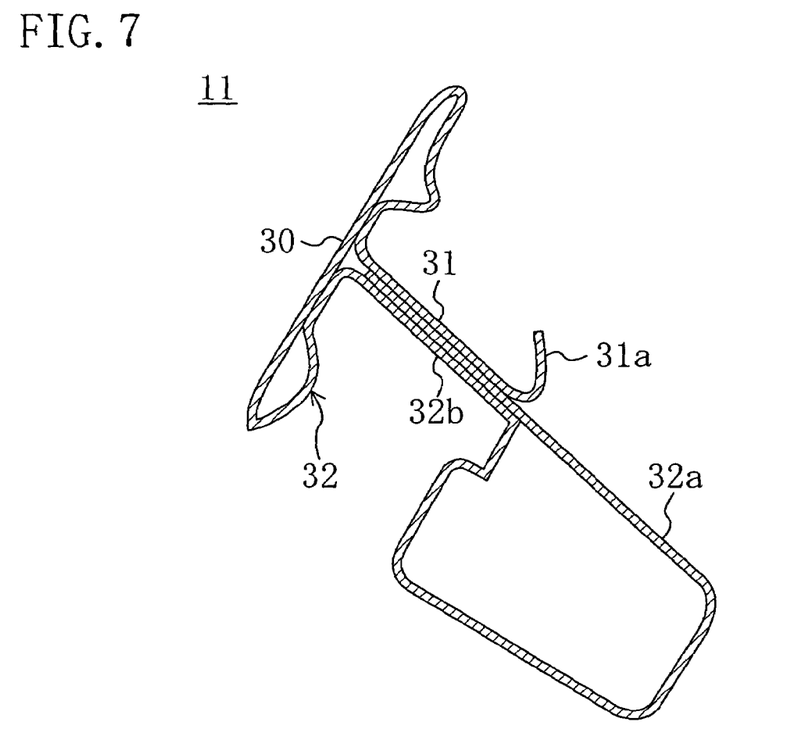
FIG. 7 is a cross-sectional view taken along the line C-C of FIG. 2.

On the other hand, the top side sash component 11 is obtained by roll-forming a single plate material as shown in FIGS. 6 and 7. This top side sash component 11 has a flat part 30 located substantially flush with the flat part 15 of the outer panel 14. The upper and lower ends of the flat part 30 continue to a pair of intermediate plates 31 and 32, respectively, that extend to the vertical center of the flat part 30 and then toward the vehicle interior. The upper intermediate plate 31 is formed at its vehicle interior side end with a curved part 31a bowed upward. An unshown sealing material is placed in engagement with the curved part 31a on the top side of the intermediate plate 31. This eliminates the need to provide an additional member for attaching the sealing material to the sash 3, which reduces the number of parts for the sash 3. Further, as shown in FIG. 5, the rear edge of the flat part 30 is shaped to conform to the cutaway 15a of the outer panel 15 of the rear side sash component 10. The rear edge of the flat part 30 is butt-welded to the edge of the cutaway 15a of the outer panel 15. Though not shown, the welded joint between the flat part 30 and the outer panel 15 may be covered with a cover such as a garnish. This eliminates the need for finishing touches for the welded joint.

The lower intermediate plate 32 is folded to form a substantially rectangular, closed cross-sectional part 32a toward the vehicle interior. The closed cross-sectional part 32a continues to the raised part 21 of the rear side sash component 10. The part of the intermediate plate 32 located between the closed cross-sectional part 32a and the flat part 30 constitutes a holder part 32b for holding the top edge of the window glass G. The holder part 32b has an inverted U-shape that is open downward. An unshown glass run is placed in the holder part 32b.

In the vehicle door 1 according to this embodiment, since the inner and outer panels 13 and 14 of the rear side sash component 10 are press-formed, the shapes of both the panels 13 and 14 can be flexibly designed, which makes it possible to easily alter the shapes partway along their lengths. Therefore, while it can be avoided that the forming of the rear side sash component 10 becomes difficult, the rigidity of the sash 3 can be ensured by increasing the cross-sectional size of the part of the rear side sash component 10 toward the lower end and the weight of the sash 3 can be reduced by decreasing the cross-sectional size of the part of the rear side sash component 10 toward the upper end. Further, since the cross-sectional shape of the rear side sash component 10 can be altered partway along its length, the rear side sash component 10 can be formed to have a shape matched with the vehicle design.

Furthermore, since the raised part 21 of the inner panel 13 is formed to increase the dimensions in both the directions of interior to exterior and front to rear of the vehicle with approach to its lower end, the cross-sectional size of the part of the rear side sash component 10 toward the lower end can be increased to give the sash 3 a sufficient rigidity.

Furthermore, since the outer panel 14 is formed integrally with the holder part 16 for holding the window glass G, the number of parts for the sash 3 can be reduced, which provides weight reduction and cost reduction of the sash 3. In addition, since the holder part 16 has a channel shape, this enhances the rigidity of the rear side sash component 10.

Furthermore, since the top side sash component 11 is obtained by roll-forming a single plate material, the number of parts for the top side sash component 11 can be reduced, which provides cost reduction. In addition, since the top side sash component 11 is formed such that its flat part 30 and intermediate plates 31 and 32 form a substantially T-shaped cross section, the top side sash component 11 can be reduced in weight and enhanced in rigidity.

Furthermore, since the outer panel 15 is formed with the cutaway 15a of substantially L-shape and the rear edge of the flat part 30 of the top side sash component 11 is butt welded to the edge of the cutaway 15a, this ensures a large joint area between the outer panel 15 and the flat part 30. Thus, the joint strength between the outer panel 15 and the flat part 30 can be enhanced.

Though in the above embodiment the inner and outer panels 13 and 14 of the rear side sash component 10 are both press-formed, only the inner panel 13 may be press-formed and the outer panel 14 may be roll-formed. In this case, the outer panel 14 formed integrally with the holder part 16 and having a complicated cross section can be easily formed.

Though in the above embodiment the outer panel 14 of the rear side sash component 10 is formed integrally with the holder part 16 for holding the rear edge of the window glass G, the part for holding the rear edge of the window glass G may be composed of a holder member 40 separate from the inner and outer panels 13 and 14. Specifically, as in Modification 1 shown in FIG. 8, the front end of the inner panel 13 is separated from the front end of the outer panel 14 to create a slit-like clearance therebetween and, in this clearance, a channel-shaped holder member 40 is placed which has, like the holder part 16, an outside wall 40a, a bottom wall 40b and an inside wall 40c.

Figure 8:
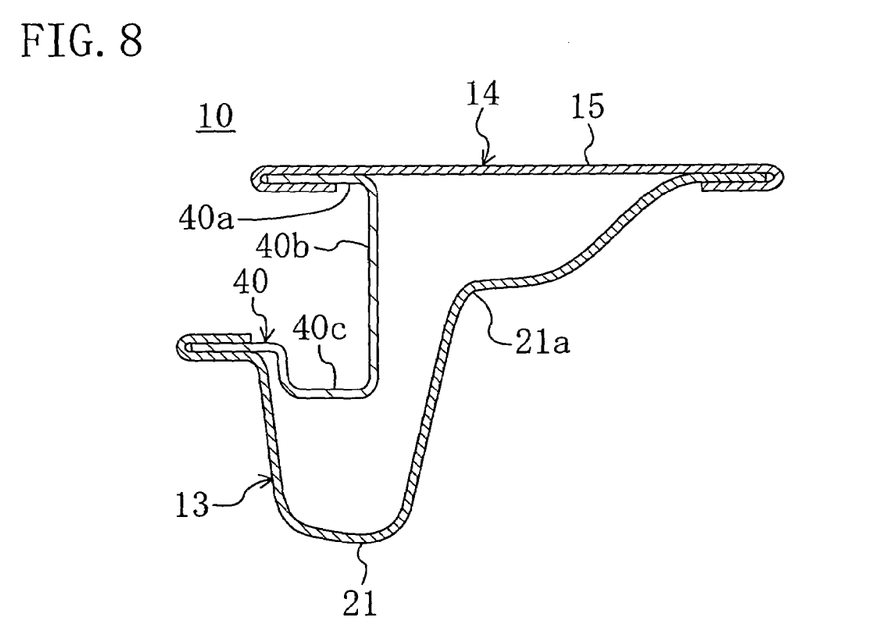
FIG. 8 is a corresponding view of FIG. 3A according to Modification 1 of the embodiment.

In joining the holder member 40 to the inner and outer panel 13 and 14, the front end of the outer panel 14 is overlapped with the outside wall 40a of the holder member 40 and then hemmed to hold the outside wall 40a of the holder member 40 in a sandwich manner. Further, the front end of the inner panel 13 is overlapped with the inside wall 40c of the holder member 40 and then hemmed to hold the inside wall 40c of the holder member 40 in a sandwich manner.

In this modification, since the holder member 40 is separate from the inner and outer panels 13 and 14, the forming die for the holder member 40 can be easily configured as compared with when the inner panel 13 or the outer panel 14 is integrally formed with a channel-shape part, which facilitates the forming of the inner and outer panels 13 and 14. Further, since the inner and outer panels 13 and 14 are hemmed to hold the outside wall 40a and inside wall 40b of the holder member 40, the ends of the holder member 40 are covered with both the panels 13 and 14. This improves the vehicle exterior and interior appearances of the sash 3 without any additional finishing touch, which reduces the number of steps for manufacturing the door 1. In addition, the worker can be prevented from touching the front ends of the inner and outer panels 13 and 14 and the ends of the holder member 16 in assembling the door 1 to the vehicle, which provides a safe assembly work. Furthermore, if the outer panel 14 has a relatively simple cross section as in this modification, the outer panel 14 can be press-formed, which reduces production cost.

Figure 9:
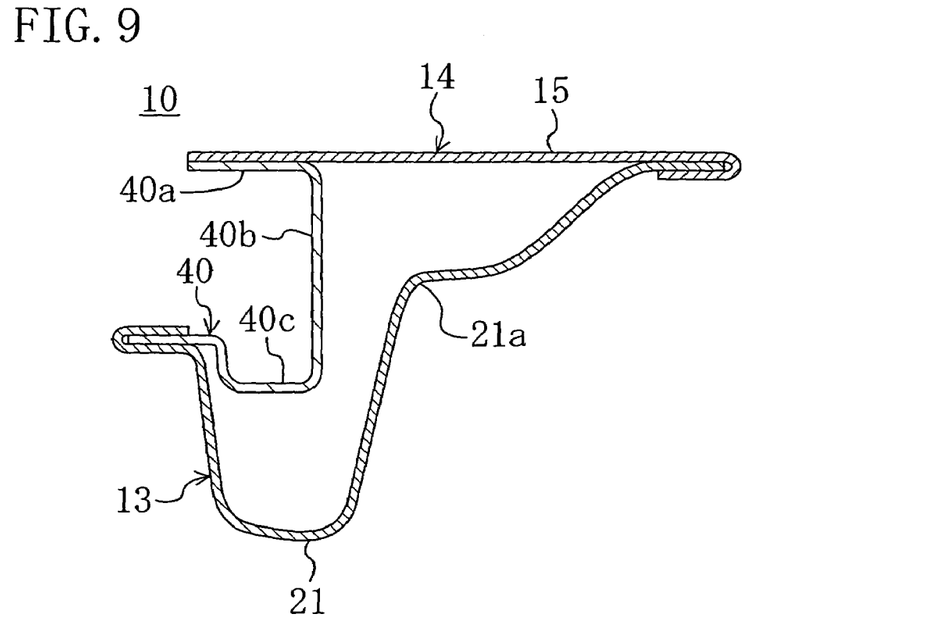
FIG. 9 is a corresponding view to FIG. 3A according to Modification 2 of the embodiment.
Figure 10:
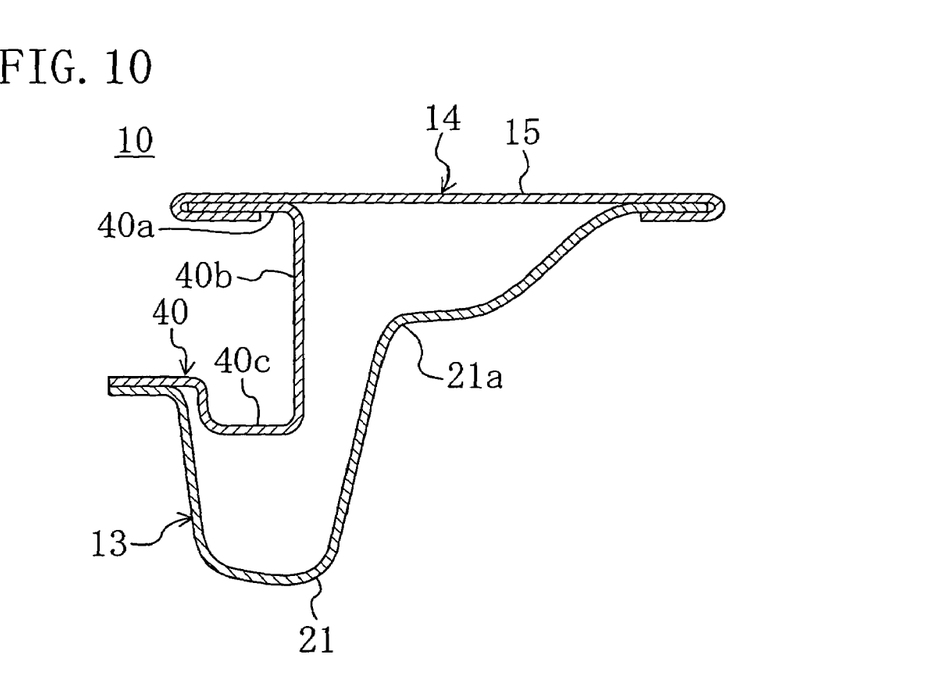
FIG. 10 is a corresponding view to FIG. 3A according to Modification 3 of the embodiment.

Alternatively, when the holder member 40 is provided separately from the inner and outer panels 13 and 14 as described above, the outside wall 40a of the holder member 40 may be overlapped with the front end of the outer panel 14 and then joined thereto, for example, by spot welding as in Modification 2 shown in FIG. 9. If the holder member 40 and the outer panel 14 are joined by welding, the joint strength between these members can be ensured while the manufacturing steps can be simplified as compared with when the outer panel 14 is hemmed. Still alternatively, as in Modification 3 shown in FIG. 10, the inside wall 40c of the holder panel 40 may be overlapped with the front end of the inner panel 13 and then likewise joined thereto by spot welding.

Figure 11:
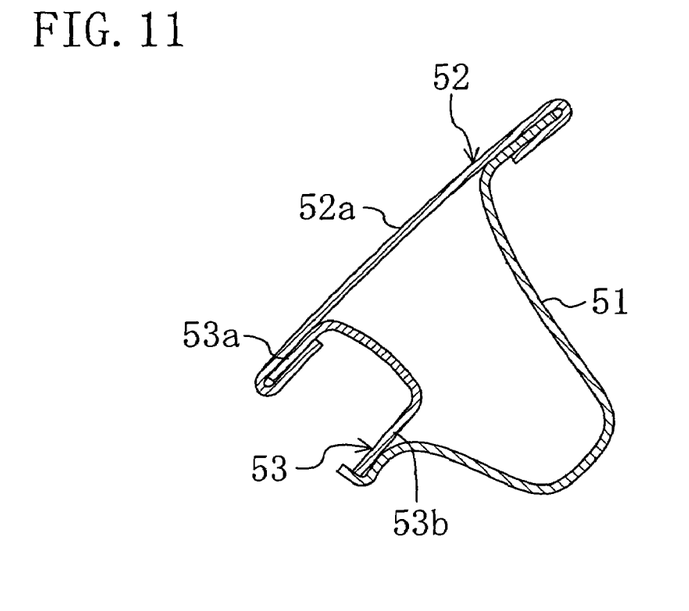
FIG. 11 is a corresponding view to FIG. 7 according to Modification 4 of the embodiment.

Though in the above embodiment the top side sash component 11 is formed of a single plate material, it may be formed of a plurality of plate materials as in Modification 4 shown in FIG. 11. Specifically, the top side sash component 11 in this modification is constructed by combining an inside member 51 located toward the vehicle interior, an outside member 52 located toward the outside of the vehicle and a holder member 53 for holding the top edge of the window glass G. The inside wall 51 is roll-formed to bulge toward the vehicle interior. The outside member 52 has an outer surface 52a forming the vehicle exterior surface of the top side sash component 11 and is entirely press-formed. Further, the holder member 53 is press-formed to have a channel shape that is open downward.

Then, the upper end of the outside member 52 is overlapped with the upper end of the inside member 51 and hemmed to hold the upper end of the inside member 51 in a sandwich manner. Likewise, the lower end of the outside member 52 is overlapped with the outside wall 53a of the holder member 53 and hemmed to hold the outside wall 53a in a sandwich manner. Further, the inside wall 53b of the holder member 53 is overlapped with the lower end of the inside member 51 and joined thereto, for example, by spot welding.

In this modification, since the outside member 52 is formed by press-forming which provides a high forming accuracy relatively easily, the forming accuracy of the outer surface 52a of the outside member 52 can be enhanced at low cost. This improves the appearance of the top side sash component 11.

In Modification 4, the inside member 51 may be press-formed. In this case, prior to press-forming, the inside member 51 is joined to the inner panel 13 of the rear side sash component 10 and the front plate material 4c of the inner member 4. Thus, the inside member 51, the inner panel 13 and the inner member 4 can be press-formed together. If the inside member 51 and the inner panel 13 are joined and then press-formed together in this manner, only welding the outside member 52 to the outer panel 14 is needed for the sash 3 after the press-forming, which reduces the number of welding points after the forming. Therefore, the number of welding steps and the number of finishing steps after the welding can be reduced. Further, if a garnish or the like is provided to cover the welding point between the outside member 52 and the outer panel 14, this eliminates the need for finishing touches after the welding. Since the shapes of the elements in this case are the same as in Modification 4, they are not shown.

Figure 12:
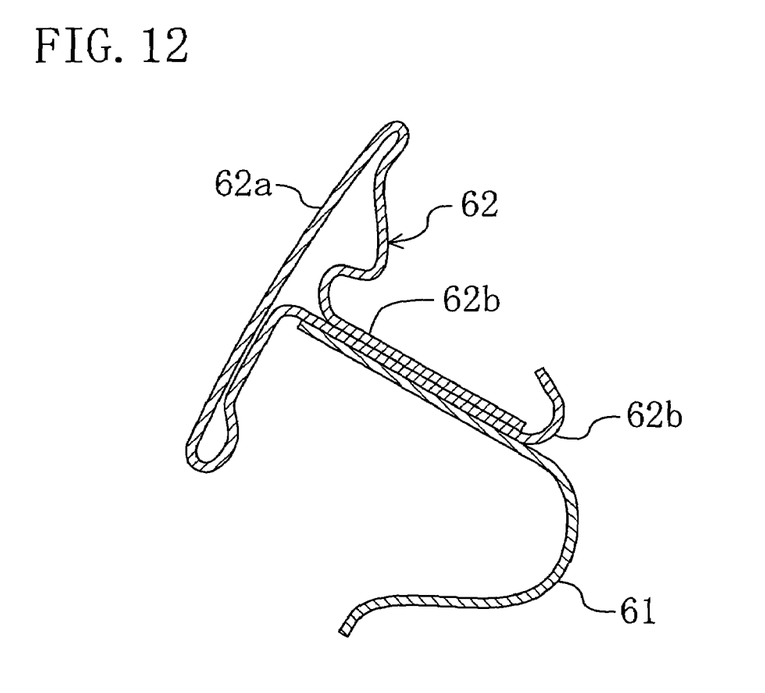
FIG. 12 is a corresponding view to FIG. 7 according to Modification 5 of the embodiment.

The top side sash component 11 may be composed of two plate materials as in Modification 5 shown in FIG. 12. Specifically, the top side sash component 11 is composed of an inside member 61 located toward the vehicle interior and an outside member 62 located toward the outside of the vehicle. The inside member 61 is press-formed to have a substantially U-shaped cross section that is open toward the outside of the vehicle. On the other hand, the outside member 62 is roll-formed and has an outside part 62a extending vertically to form the vehicle exterior surface of the top side sash component 11. The upper and lower ends of the outside part 62a continue to intermediate plates 62b, respectively, extending toward the vertical center of the outside part 62a. After extending to the vertical center of the outside part 62a, these intermediate plates 62b are bent toward the vehicle interior. Further, the inside member 61 is bonded to the underside of the lower intermediate plate 62b. Since the cross section of the outside member 62 is formed in a substantially T-shape by the outside part 62a and the intermediate plates 62b in this manner, this ensures a sufficient rigidity of the top side sash component 11. In addition, since the outside member 62 is roll-formed, it can be easily formed as compared with when it is press-formed.

Figure 13:
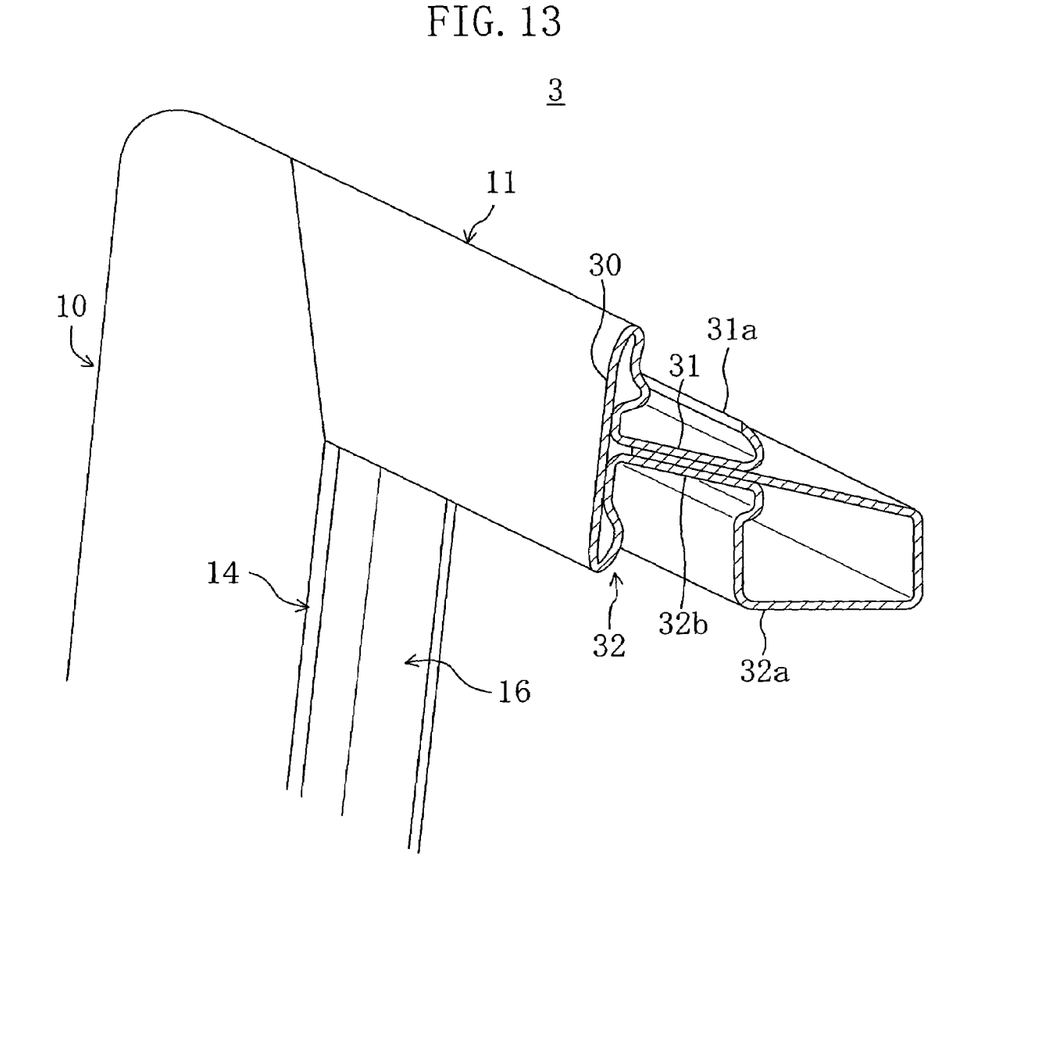
FIG. 13 is a corresponding view to FIG. 5 according to Modification 6 of the embodiment.

As in Modification 6 shown in FIG. 13, the rear edge of the flat part 30 of the top side sash component 11 may be shaped linearly to extend obliquely such that it is located at an upper level with approach to the rear end. In this case, the upper end part of the rear side sash component 11 joined to the rear edge of the flat part 30 has a linear shape that conforms to the shape of the rear edge of the flat part 30. Thus, the rear edge of the top side sash component 11 and the upper end of the rear side sash component 10 can be joined together while both having simple linear shapes.

Figure 14:
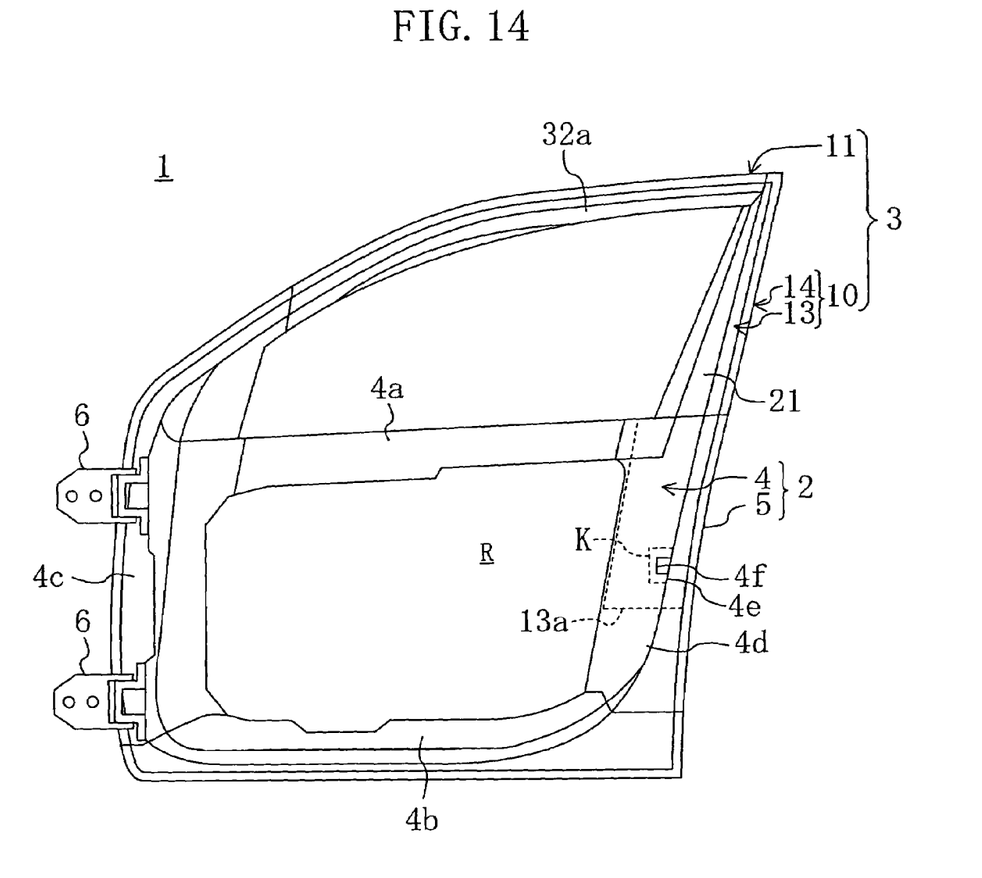
FIG. 14 is a corresponding view to FIG. 2 according to Modification 7 of the embodiment.

As in Modification 7 shown in FIG. 14, the rear side sash component 10 may have an extension 13a formed by extending downward the lower part of the inner panel 13. This extension 13a is formed to conform to the outer surface of the rear plate material 4d of the door body 2. The lower end of the extension 13a extends below beyond the latch mechanism placement part 4e. The extension 13a is overlapped with the latch mechanism placement part 4e to form a two-tier configuration. The extension 13a and the latch mechanism placement part 4e are bonded at suitable points to each other, for example, by welding. Thus, the latch mechanism placement part 4e can be reinforced by the extension 13a without leading to increased number of parts, which provides cost reduction. Further, the extension 13a can be firmly joined to the door body 2, which provides a sufficient joint strength between the sash 3 and the door body 2.

Figure 15:
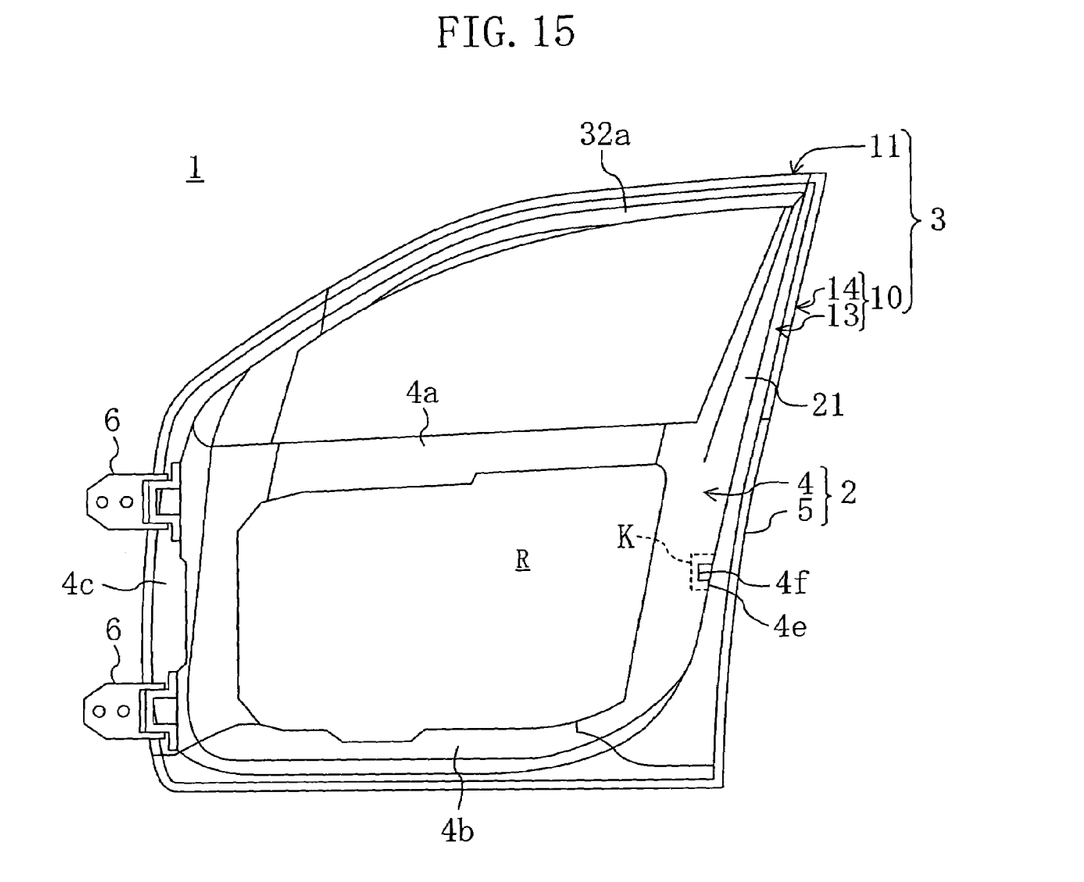
FIG. 15 is a corresponding view to FIG. 2 according to Modification 8 of the embodiment.

As in Modification 8 shown in FIG. 15, the lower part of the inner panel 13 of the rear side sash component 10 may be formed to extend down to the vicinity of the lower end of the door body 2. In this modification, the rear plate material 4d of the inner member 4 of the door body 2 is dispensed with and the rear plate material 4d is formed of the lower half of the inner panel 13. In this case, prior to press-forming, the inner panel 13 is joined to the inner member 4 of the door body 2. Then, the inner panel 13 and the inner member 4 are press-formed together. In this Modification 8, since the lower half of the inner panel 13 of the rear side sash component 10 also forms the rear end part of the door body 2, the joint strength between the sash 3 and the door body 2 can be enhanced without leading to increased number of parts.

INDUSTRIAL APPLICABILITY

As described so far, a vehicle door according to this invention is suitable for the placement in vehicles such as passenger cars.

What is claimed is:

1. A vehicle door in which a door body placed on each side of a vehicle is provided with a sash for holding a window glass, wherein
the sash comprises a rear side sash component extending upward from an upper part of the rear end of the door body along the rear edge of the window glass,
the rear side sash component is formed by joining an inner panel and an outer panel together, and
the inner panel is press-formed and the outer panel is press-formed or roll-formed such that the cross-sectional size of the rear side sash component is increased with approach to the lower end thereof,
wherein
the door body is formed by joining an inner member and an outer member together,
the rear side of the inner member is provided with a latch mechanism placement part in which a latch mechanism is placed,
a lower part of the inner panel of the rear side sash component extends at least to the latch mechanism placement part, and
the inner panel and the latch mechanism placement part are joined together in overlapping relation.

* * * * *